3,654,356
OXIDATION OF p-TOLUIC ACID TO TEREPHTHALIC ACID

John W. Ager, Princeton, N.J., assignor to FMC Corporation, New York, N.Y.
No Drawing. Filed Apr. 1, 1970, Ser. No. 24,799
Int. Cl. C07c 63/02
U.S. Cl. 260—524 R    2 Claims

ABSTRACT OF THE DISCLOSURE p-Toluic acid is oxidized to terephthalic acid by elemental oxygen at mildly elevated temperatures and pressures in the presence of a catalyst consisting of copper chloride, potassium chloride, hydrochloric acid and a rare-earth chloride of the group consisting of cerium, praseodymium and neodymium; cobalt chloride is an optional additional ingredient.

BACKGROUND OF THE INVENTION

Terephthalic acid (TPA) has become an important basic chemical since the polyester polyethylene glycol terephthalate has found extensive use in the fiber and film field. It is generally produced by the oxidation of p-xylene, using principally nitric acid or elemental oxygen as the oxidizing agents. The oxidation appears to proceed stepwise, going first to p-toluic acid and then to TPA. The first step is a fairly easy one; the full conversion is considerably more difficult. While the present processes are reasonably effective, there is still need for processes which will improve yields and produce fewer by-products which must be removed to produce fiber-grade TPA. The ease of recovery of catalyst is also an important cost consideration.

OBJECTS OF THE INVENTION

It is the principal object of the present invention to produce TPA from p-toluic acid in high yields, at relatively low temperatures, with readily recoverable low-cost catalyst.

STATEMENT OF THE INVENTION

In accordance with the present invention, p-toluic acid is reacted with elemental oxygen at temperatures from about 160° C. to about 200° C., at pressures of from at least about 200 pounds per square inch gage (p.s.i.g.) measured at room temperature, for about ½ hour or more in the presence of a catalyst comprising copper chloride, a rare-earth chloride of the group consisting of cerium, neodymium and praseodymium, and preferably also cobalt chloride, plus hydrogen chloride as activator for the catalyst, to get yields of terephthalic acid (TPA) which are as high as 95% of theory.

DETAILED DESCRIPTION OF THE INVENTION

The starting material for the instant process is p-toluic acid, which can be readily prepared by mild oxidation of p-xylene, in good yields.

The oxidizing medium used is elemental oxygen, preferably undiluted oxygen if a batch operation is employed, but which can be air, or air enriched with oxygen, where the reactants are being fed and the reaction product withdrawn continuously.

The catalyst used is what distinguishes the process of this invention from previous work. I have found a mixture of copper chloride, potassium chloride, and a rare-earth chloride of the group consisting of cerium, praseodymium and neodymium, can be activated by the addition of hydrochloric acid to make a very effective catalyst. This type of catalyst is known to be useful in oxychlorination reacting where it serves to catalyze the conversion of HCl to elemental chlorine; but I have no theory to offer as to how it works in the instant and quite different sort of reaction. Cobalt chloride is a highly desirable added ingredient in the catalyst, since it serves to speed up the reaction and thus increases conversion per pass. It is particularly useful in reactions where diluent is employed.

The catalyst is used in fairly substantial quantities, of the order of about 5 to 15 weight percent of mixed catalyst based on the weight of p-toluic acid; the activator hydrochloric acid is generally most conveniently added as concentrated hydrochloric acid—33% in water—using about 5 to 15 weight percent (as pure hydrogen chloride) based on p-toluic acid. In continuous operations, the catalyst and acid are mixed with the p-toluic acid, and fed through the reactor with continuous stirring, as by a screw.

The principal advantage of the present invention is the relatively low catalyst cost, particularly since the catalyst metals are readily recoverable in working up the product.

The oxidation is run under relatively mild conditions, from about 160 to 200° C. and at pressures of at least about 200 p.s.i.g. measured at room temperature. Increasing pressures up to about 800 p.s.i.g. speeds reaction; above this pressure, no advantage is gained. The time needed varies with the desired conversion, exact temperature, and concentration of ingredients—about ½ hour to about 3 hours is generally useful in getting the desired results.

I prefer to operate without diluents because diluents tend to slow up the reaction. Where diluents are used, a perchlorinated or perfluorinated organic liquid is preferred—e.g. carbon tetrachloride, trichloroacetic acid, or the liquid perfluoroalkanes. Where diluents are not employed, I use a high enough temperature to liquefy the batch.

SPECIFIC EXAMPLES OF THE INVENTION

The following specific examples of the invention are given by way of illustration, and not by way of limitation.

EXAMPLE 1

A mixture of 0.05 gram mol p-toluic acid (6.9 grams), 0.1 gram cuprous chloride, 0.1 gram cupric chloride, 0.1 gram cerium trichloride, 0.1 gram potassium chloride, and 2 ml. concentrated hydrochloric acid was put in a glass liner in a 300 ml. stainless-steel autoclave and pressured to 300 p.s.i.g. with oxygen. The autoclave was heated at 200° C. for 2½ hours. The result of the reaction was a 45% conversion of p-toluic acid and an 85% yield of TPA.

The hydrochloric acid was omitted, and the example repeated several times. No TPA was obtained.

EXAMPLE 2

Example 1 was repeated, except that 0.1 gram cobalt chloride was added. The resultant conversion was 58%, the yield of TPA was 88% of theory. A repeat run gave a conversion of 60%, a 95% yield of TPA.

EXAMPLE 3

Example 2 was repeated, with the addition of 7 grams trichloroacetic acid. Conversion was 62%, yield 90% TPA.

EXAMPLE 4

Example 2 was repeated at 500 p.s.i.g. Conversion was 70%; yield of TPA was 91%.

EXAMPLE 5

Example 1 was repeated, using neodymium chloride instead of cerium chloride. Conversion was 40%, yield of TPA was 80. The substitution of praseodymium for neodymium gave a 40% conversion, with a yield of 82% TPA.

EXAMPLE 6

Example 2 was repeated, using 25 grams carbon tetrachloride as diluent. A 26% conversion, with 68% yield of TPA, was obtained.

Obviously, the examples can be multiplied without departing from the scope of the invention as defined in the claims.

What is claimed is:

1. A process for converting p-toluic acid to terephthalic acid which comprises heating a mixture of p-toluic acid, a catalyst consisting essentially of copper chloride, potassium chloride, a rare-earth chloride of the group consisting of cerium, neodymium and praseodymium, and optionally cobalt chloride, together with hydrochloric acid as a catalyst activator, in the presence of elemental oxygen at a temperature of 160 to 200° C., and at a pressure of at least 200 p.s.i.g., measured at room temperature, for a time sufficient to produce the desired degree of conversion.

2. The process of claim 1, in which the combined catalyst is from 5 to 15 weight percent based on p-toluic acid, and the hydrochloric acid is from 5 to 15 weight percent (as 100% acid) based on p-toluic acid.

References Cited

UNITED STATES PATENTS

| 2,245,528 | 6/1941 | Loder | 260—524 |
| 3,012,043 | 12/1961 | Dowden et al. | 260—524 |

FOREIGN PATENTS

| 841,244 | 7/1960 | Great Britain | 260—524 |

JAMES A. PATTEN, Primary Examiner

R. S. WEISSBERG, Assistant Examiner

U.S. CL. X.R.

252—441